United States Patent [19]

Monnier

[11] Patent Number: 5,894,726

[45] Date of Patent: Apr. 20, 1999

[54] PROCESS FOR CONTROLLING THE INTAKE OF A DIRECT-INJECTION FOUR-STROKE ENGINE

[75] Inventor: Gaétan Monnier, Rueil-Malmaison, France

[73] Assignee: Institute Francais du Petrole, Rueil-Malmaison, France

[21] Appl. No.: 08/958,344

[22] Filed: Oct. 27, 1997

[30] Foreign Application Priority Data

Oct. 28, 1996 [FR] France ................... 96 13216

[51] Int. Cl.$^6$ ................... F01N 3/20; F02M 25/07
[52] U.S. Cl. ................... 60/274; 60/278; 123/443; 123/568
[58] Field of Search ................... 123/443, 568; 60/274, 278, 299, 301, 900

[56] References Cited

U.S. PATENT DOCUMENTS

| | | | |
|---|---|---|---|
| 3,708,980 | 1/1973 | Truxell | 123/443 X |
| 3,955,363 | 5/1976 | Manderscheid | 60/277 |
| 4,056,931 | 11/1977 | Hata | 123/443 X |
| 4,133,174 | 1/1979 | Masaki | 60/282 X |
| 4,305,249 | 12/1981 | Schmid et al. | 60/274 |
| 4,391,240 | 7/1983 | Sugasawa et al. | 123/198 F |
| 4,409,949 | 10/1983 | Tanaka et al. | 123/443 X |
| 4,467,602 | 8/1984 | Iizuka et al. | 60/276 |
| 5,056,308 | 10/1991 | Kume et al. | 60/276 |
| 5,247,793 | 9/1993 | Yamada et al. | 60/276 |
| 5,661,971 | 9/1997 | Waschatz et al. | 123/443 X |

FOREIGN PATENT DOCUMENTS

| | | |
|---|---|---|
| 2715971 | 8/1995 | France . |
| 4310145 | 4/1994 | Germany . |

*Primary Examiner*—Tony M. Argenbright
*Attorney, Agent, or Firm*—Antonelli, Terry, Stout & Kraus, LLP

[57] ABSTRACT

The present invention is a process for controlling the intake of a direct fuel injection four-stroke engine in at least two combustion chambers. A diferent intake for at least two cylinders or groups of cylinders is used in order to reduce exhaust emissions. A first cylinder or group of cylinders is operated with an air/fuel ratio greater than or equal to one, and a second cylinder or group of cylinders (21, 24) is operated in under-stoichiometric conditions.

24 Claims, 1 Drawing Sheet

PROCESS FOR CONTROLLING THE INTAKE OF A DIRECT-INJECTION FOUR-STROKE ENGINE

BACKGROUND OF THE INVENTION

1. Field of the Invention

The present invention relates to the field of four-stroke internal-combustion and direct fuel injection engines. More particularly, the present invention uses intake control in order to reduce the consumption as well as the emissions of such engines.

2. Description of the Prior Art

A high reduction in the cosumption of fuel requires a diluted charge combustion which is generally not compatible with after-treatment of the gaseous effluents.

A large reduction in the consumption of spark-ignition engines requires diluted charge combustion (air and/or EGR) in order to decrease pumping losses of the charge and to increase the polytropic coefficient of the gases, and consequently the efficiency of the four-stroke engine cycle.

However, engines with a highly diluted combustion mixture cannot use an after-treatment of the gaseous effluents by trifunctional catalysis in order to meet the current regulations concerning emission levels, because the fuel/air ratio at the exhaust is below 1 wherein a ratio of 1 represents a stoichiometric mixture with a ratio above 1 being a rich mixture and a ratio below 1 being a lean mixture.

First-generation concepts have already been introduced into the market by automotive manufacturers; these are lean-burn engines (Honda VTE, Toyota Carina, . . . ). They allow urban driving consumption gains of the order of 10% in relation to conventional engines. However, in order to meet emission regulations, these lean-burn engines are generally operated under conventional stoichiometric conditions during cold start-up phases and accelerations. This strategy controls emissions of the vehicle by using a conventional trifunctional catalysis depollution system, but it suppresses any consumption gain of the vehicle during these operating phases.

The second-generation solutions that have followed the first-generation solutions are linked with the development of direct fuel injection. Second-generation systems, coupled with stratified combustion control, allow urban driving consumption gains of the order of 20% by suppressing pumping losses of the four-stroke engine cycle.

Like the first concepts, these engines cannot be subjected to trifunctional catalysis at the risk of nullifying the expected consumption gains.

Generally speaking, the two main problems linked with removing pollution from direct fuel injection engines with stratified combustion are as follows:

Nitrogen oxides emissions cannot be readily subjected to after-treatment by $No_x$ catalysis and they must therefore be low in quantity in the exhaust.

The temperature of the exhaust gases is too low for fast initiation of the oxidation catalyst for conversion of the carbon monoxide and of the unburned hydrocarbons.

Concerning the second problem, heating systems, notably electric systems for heating the oxidation catalyst, have already been considered. However, these systems are costly in energy, which poses problems notably during start-up of the vehicle.

SUMMARY OF THE INVENTION

The present invention notably improves the abovementioned problems concerning direct-injection four-stroke engines.

The invention maintains the consumption gain of direct fuel injection engines while meeting emissions requirements by means of a specific engine control cylinder by cylinder.

Intake control is specifically provided by the invention.

One way of controlling the flow of intake air is disclosed in French patent application EN.95/07,384 filed by the assignee. This document discloses a simple solution allowing reliable shift from one method of operation to another, which allows optimized combustion management.

The present invention is a process for controlling the intake of a direct fuel injection four-stroke engine in at least two combustion chambers.

The process according to the invention operates differently, by means of a different intake, at least two cylinders or groups of cylinders in order to reduce exhaust emissions.

In particular, a first cylinder or group of cylinders is operated with a fuel/air ratio one or greater and a second cylinder or group of cylinders is operated with a lean fuel/air ratio less than stoichiometric conditions.

Furthermore, a specific exhaust gas processing systems is associated with each cylinder or group of cylinders.

More precisely, a redox catalyst is associated with the first cylinder or group of cylinders.

A main catalyst is associated with the exhaust of the second cylinder or group of cylinders.

According to a particular embodiment of the invention, the main catalyst is placed downstream from the redox catalyst and at the exhaust outlet of the second cylinder or group of cylinders.

At least part of the exhaust gases of the first cylinder or group of cylinders is recycled to the general intake of the engine.

More particularly, the recycled exhaust gases are taken upstream from the gas processing system associated with the first cylinder or group of cylinders.

BRIEF DESCRIPTION OF THE DRAWINGS

Other features, details and advantages of the present invention will be clear from reading the description hereafter, given by way of non limitative examples, with reference to the accompanying drawings wherein.

DESCRIPTION OF THE PREFERRED EMBODIMENTS

Figure 1:
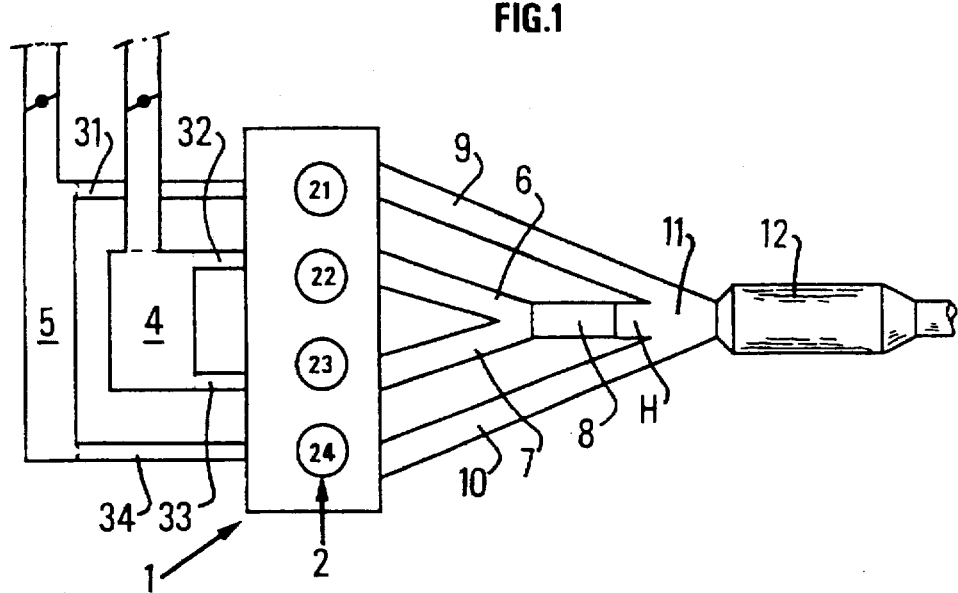
FIG. 1 is a simplified diagram of an embodiment of the invention.

FIG. 1 diagrammatically shows an engine 1 comprising four cylinders 21, 22, 23, 24 having each an air intake 31, 32, 33, 34.

According to the invention, the intakes are divided into at least two independent groups having each their own air flow control system 4, 5.

For an engine such as that shown in FIG. 1, i.e. having four cylinders, the intakes of two cylinders 22 and 23 can for example be grouped together in a first plenum 4 and the intakes of the other two cylinders 21, 24 in a second plenum 5.

Thus, during partial load runnig, the invention operates the first group of cylinders 22, 23 with a fuel/air ratio close to stoichiometry or even with a ratio above one; for the second group of cylinders 21, 24, a stratified intake with full air inflow is simultaneously provided with a fuel/air ratio less than stoichiometric.

A substantial consumption gain can thus be obtained as a result of the stratified combustion in the second group of cylinders.

Besides, the exhaust of the various cylinders can be organized as follows:

The first group of cylinders 22, 23 has either a common exhaust, or each a line 6, 7, the lines joining eventually just upstream from a first gas processing device 8 such as a three-way catalyst known in the art.

The exhaust of the second group of cylinders 21, 24 can be made up of two lines 9, 10, each starting from a cylinder, and which join eventually in a zone 11.

Zone 11 is preferably situated downstream from the first gas processing device 8 and upstream from a second gas processing device 12, referred to as main catalyst in the text hereafter.

With such a layout of the exhaust, it is possible to obtain a conventional reduction in pollution in the gases emitted by the first group of cylinders 22, 23 by means of the first catalyst 8.

In addition to this advantage, a consumption gain is obtained by means of the second group of cylinders which runs in stratified mode, with a very lean mixture.

Such a cylinder by cylinder and especially cycle by cycle control of the injection is possible thanks to the direct injection of fuel in the cylinders, which notably suppresses air/fuel ratio control problems linked with the wetting of the walls.

Furthermore, according to the invention, the total engine load can be non evenly distributed among the groups of cylinders.

It is thus possible to minimize the load on the cylinders running in stratified mode which already exhibit a good efficiency, and to increase the load on cylinders 22, 23 running under stoichiometric conditions, in order to improve the efficiency by reducing the low-pressure loop of the (Pressure, Volume) diagram of the engine.

Furthermore, with a view to fast initiation of catalyst 8 during start-up of the vehicle, it is possible to operate the first group of cylinders 22, 23 with a fuel/air ratio much greater than 1. This allows minimizing nitrogen oxide emissions of the engine, and above all generation of hydrogen emissions that will allow fast initiation of main catalyst 12 placed downstream from catalyst 8.

In other words, according to the invention, a rather lean average fuel/air mixture on the main catalyst is obtained by combining an operation of the first group of cylinders 22, 23 with a fuel/air ratio much greater than 1 in order to generate hydrogen with an operation of the second group of cylinders 21, 24 with a very lean mixture less than stoichiometric (stratified combustion) in order to supply the oxygen required for the initiation of main catalyst 12. According to this operation, zone 11 therefore contains a rather lean mixture. The second group of cylinders 21, 24 will thus be typically operated with fuel/air ratio below about 0.7.

More precisely, the main catalyst 12 essentially processes the gases from the second group of cylinders.

Figure 2:
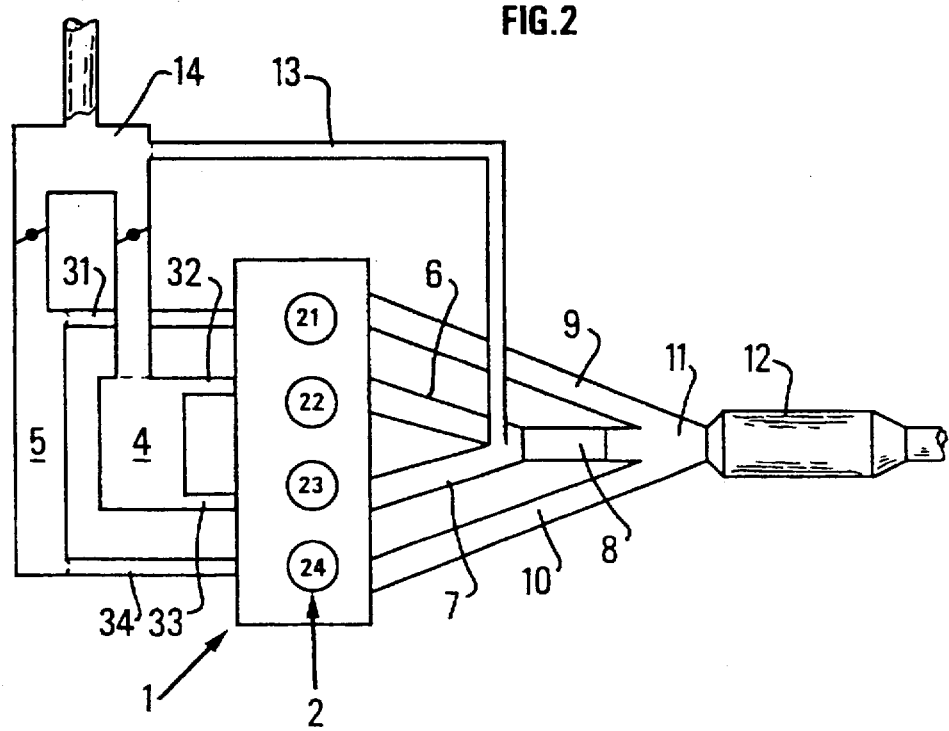
FIG. 2 is a simplified diagram of another embodiment of the invention.

FIG. 2 illustrates an embodiment of the invention that comprises the same elements as those described in connection with FIG. 1. Furthermore, a line 13 is provided according to this embodiment. Line 13 opens on the one hand into the common outlet of the exhausts 6, 7 of the first group of cylinders and on the other hand into intake 14 common to all the cylinders. It is thus a recycled gas line allowing drawing off of exhaust gases emitted by cylinders 22, 23 having the highest fuel/air ratio and to recycle these gases to the intake.

Selection of the recycled gas tapping point advantageously allows minimizing the flow of gas towards the intake since, at the selected point, the exhaust gases are the richest in carbon dioxide ($CO_2$).

Tapping in zone 11 for example would be much less interesting from this point of view.

Of course, the present invention does not apply only to engines having cylinders such as those described above. In particular six-cylinder engines with two groups of three cylinders each can be used according to the invention. Similarly, the groups of cylinders may not all comprise the same number of cylinders.

I claim:

1. A process for controlling a direct fuel injection four-stroke multiple cylinder engine having an air and fuel intake, an exhaust system and an exhaust gas recirculation system which recirculates a part of exhaust gas from the exhaust system to the air and fuel intake comprising:

operating at least one cylinder from air and fuel supplied by the air and fuel intake with a rich fuel/air ratio with a fuel/air ratio of one representing a stoichiometric mixture, a fuel/air ratio greater than one representing a rich fuel mixture, and a fuel/air ratio of less than one representing a lean mixture with exhaust gas from the at least one cylinder being circulated through a redox catalyst within the exhaust system;

operating at least one other cylinder from air and fuel supplied by the air and fuel intake with a lean mixture; and recycling with the exhaust gas recirculation system at least part of exhaust gases from the exhaust system to the air and fuel intake.

2. A process in accordance with claim 1 wherein:

the lean mixture is with a fuel/air ratio of 0.7 or less.

3. A process in accordance with claim 1 further comprising:

passing exhaust gas from the at least one other cylinder through a main catalyst.

4. A process in accordance with claim 2 further comprising:

passing exhaust gas from the at least one other cylinder through a main catalyst.

5. A process in accordance with claim 1 further comprising:

combining the exhaust gas from the at least one cylinder and the at least one other cylinder; and passing the combined exhaust gas through the main catalyst.

6. A process in accordance with claim 2 further comprising:

combining the exhaust gas from the at least one cylinder and the at least one other cylinder; and passing the combined exhaust gas through the main catalyst.

7. A process in accordance with claim 1 wherein:

the recycled exhaust gas is taken from the exhaust system upstream of the redox catalyst.

8. A process in accordance with claim 2 wherein:

the recycled exhaust gas is taken from the exhaust system upstream of the redox catalyst.

9. A process in accordance with claim 3 wherein:
the recycled exhaust gas is taken from the exhaust system upstream of the redox catalyst.

10. A process in accordance with claim 4 wherein:
the recycled exhaust gas is taken from the exhaust system upstream of the redox catalyst.

11. A process in accordance with claim 5 wherein:
the recycled exhaust gas is taken from the exhaust system upstream of the redox catalyst.

12. A process in accordance with claim 6 wherein:
the recycled exhaust gas is taken from the exhaust system upstream of the redox catalyst.

13. A process in accordance with claim 1 wherein:
the air and fuel intake includes a first air and fuel intake associated with the at least one cylinder, and a second air and fuel intake associated with the at least one other cylinder; and further comprising
adding the recycled exhaust gas to the air and fuel intake upstream of the first and second air and fuel intakes.

14. A process in accordance with claim 2 wherein:
the air and fuel intake includes a first air and fuel intake associated with the at least one cylinder, and a second air and fuel intake associated with the at least one other cylinder; and further comprising
adding the recycled exhaust gas to the air and fuel intake upstream of the first and second air and fuel intakes.

15. A process in accordance with claim 3 wherein:
the air and fuel intake includes a first air and fuel intake associated with the at least one cylinder, and a second air and fuel intake associated with the at least one other cylinder; and further comprising
adding the recycled exhaust gas to the air and fuel intake upstream of the first and second air and fuel intakes.

16. A process in accordance with claim 4 wherein:
the air and fuel intake includes a first air and fuel intake associated with the at least one cylinder, and a second air and fuel intake associated with the at least one other cylinder; and further comprising
adding the recycled exhaust gas to the air and fuel intake upstream of the first and second air and fuel intakes.

17. A process in accordance with claim 5 wherein:
the air and fuel intake includes a first air and fuel intake associated with the at least one cylinder, and a second air and fuel intake associated with the at least one other cylinder; and further comprising
adding the recycled exhaust gas to the air and fuel intake upstream of the first and second air and fuel intakes.

18. A process in accordance with claim 6 wherein:
the air and fuel intake includes a first air and fuel intake associated with the at least one cylinder, and a second air and fuel intake associated with the at least one other cylinder; and further comprising
adding the recycled exhaust gas to the air and fuel intake upstream of the first and second air and fuel intakes.

19. A process in accordance with claim 7 wherein:
the air and fuel intake includes a first air and fuel intake associated with the at least one cylinder, and a second air and fuel intake associated with the at least one other cylinder; and further comprising
adding the recycled exhaust gas to the air and fuel intake upstream of the first and second air and fuel intakes.

20. A process in accordance with claim 8 wherein:
the air and fuel intake includes a first air and fuel intake associated with the at least one cylinder, and a second air and fuel intake associated with the at least one other cylinder; and further comprising
adding the recycled exhaust gas to the air and fuel intake upstream of the first and second air and fuel intakes.

21. A process in accordance with claim 9 wherein:
the air and fuel intake includes a first air and fuel intake associated with the at least one cylinder, and a second air and fuel intake associated with the at least one other cylinder; and further comprising
adding the recycled exhaust gas to the air and fuel intake upstream of the first and second air and fuel intakes.

22. A process in accordance with claim 10 wherein:
the air and fuel intake includes a first air and fuel intake associated with the at least one cylinder, and a second air and fuel intake associated with the at least one other cylinder; and further comprising
adding the recycled exhaust gas to the air and fuel intake upstream of the first and second air and fuel intakes.

23. A process in accordance with claim 11 wherein:
the air and fuel intake includes a first air and fuel intake associated with the at least one cylinder, and a second air and fuel intake associated with the at least one other cylinder; and further comprising
adding the recycled exhaust gas to the air and fuel intake upstream of the first and second air and fuel intakes.

24. A process in accordance with claim 18 wherein:
the air and fuel intake includes a first air and fuel intake associated with the at least one cylinder, and a second air and fuel intake associated with the at least one other cylinder; and further comprising
adding the recycled exhaust gas to the air and fuel intake upstream of the first and second air and fuel intakes.

* * * * *